Oct. 19, 1954

H. H. HENDON 2,692,230

METAL SEPTIC TANK

Filed Sept. 22, 1950

INVENTOR.
HARRY H. HENDON
BY
Jennings & Carter
ATTORNEYS

Oct. 19, 1954

H. H. HENDON 2,692,230

METAL SEPTIC TANK

Filed Sept. 22, 1950

INVENTOR.
HARRY H. HENDON
BY
Jennings v Carter
ATTORNEYS

Patented Oct. 19, 1954

2,692,230

UNITED STATES PATENT OFFICE 2,692,230

METAL SEPTIC TANK

Harry H. Hendon, Birmingham, Ala.

Application September 22, 1950, Serial No. 186,143

5 Claims. (Cl. 210—6)

This invention relates to a metal septic tank for the disposal of sewage, and has for its principal object the provision of a metal septic tank in which the air space above the water line in the tank is eliminated, thus preventing internal corrosion of the tank.

Another object of my invention is to provide a septic tank of the character designated in which the floating solids or scum is kept below the water line and intimately mixed with the sewage where digestion processes are active.

A further object is to provide a metal septic tank having a top formed integrally therewith and having vertically extending inlet and outlet conduits with clean-out openings at the top thereof, thus providing a convenient means for cleaning out the tank.

A further object is to provide a metal septic tank whereby the depth and volume of the tank is greatly reduced without reducing the effective capacity of the same.

A still further object of my invention is to provide a metal septic tank which shall be economical of manufacture and simple of operation and installation and one which shall meet modern requirements set by health authorities for residential septic tanks.

Considerable effort has been heretofore exerted in an attempt to provide a satisfactory metal septic tank which will not corrode internally particularly in view of the fact that metal tanks are generally recognized as the most simple and economical type to use. As is well known, the septic or digestion action of the sewage in the tank is a biological process known as anaerobic decomposition which takes place only in the absence of oxygen. The corrosion of metal, on the other hand, is an oxidizing process which can only take place in the presence of oxygen. Therefore the liquid contents of a septic tank tend to prevent severe corrosion below the water line, while the gases produced by the digestion process, which usually contain sulphur, cause severe corrosion of the septic tank above the water line. In the report entitled "Studies on Household Sewage Disposal Systems" conducted by the U. S. Public Health Service at Cincinnati, the discussion of steel tanks that were inspected stated that, "Corrosion was most severe at and above the water line."

To overcome the difficulties discussed above, I have devised a metal septic tank in which the air space usually provided above the water line is eliminated. Briefly, my improved metal septic tank comprises two sections which are adapted for nesting one within the other, thus greatly reducing the cost of handling, shipping and installing the tanks. The upper section is provided with an integral cover having inlet and outlet connections to the tank through the top cover thereof instead of through the ends of the tank. This construction causes the tank cover to be submerged below the water line thus eliminating the air space inside the tank and causing the floating solids to remain below the water line.

A septic tank embodying features of my invention is illustrated in the accompanying drawing, forming a part of this application, in which.

Figure 1:
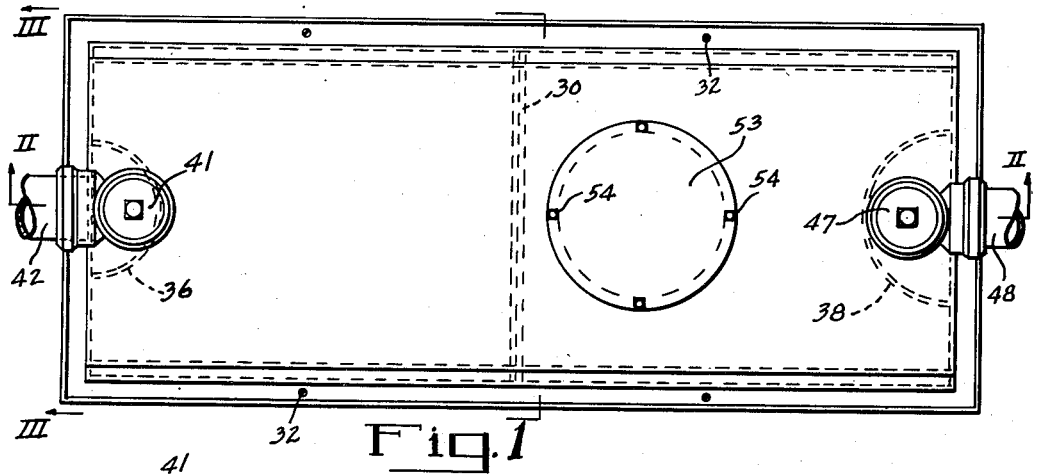
Fig. 1 is a plan view of an erected septic tank.
Figure 2:
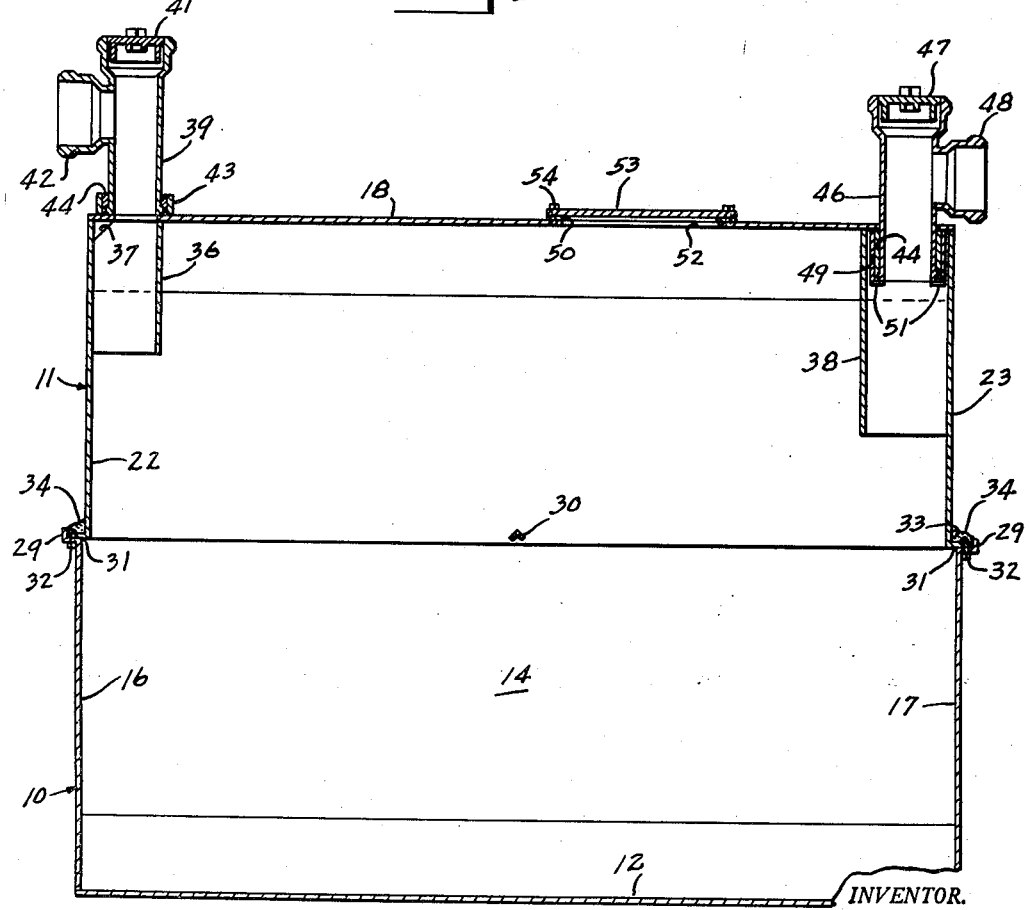
Fig. 2 is a sectional view taken along the line II—II of Fig. 1.

Referring now to the drawing for a better understanding of my invention I show a metal septic tank having a lower section 10 and an upper section 11 which is slightly shorter, slightly narrower, and shallower than the lower section 10 to provide for inverting and nesting the sections. The lower section is provided with a bottom 12, sides 13 and 14, and ends 16 and 17. The upper section is provided with an integral top or cover 18, sides 19 and 21, and ends 22 and 23. The sides 19 and 21 of the upper section converge inwardly toward the top to further aid in nesting.

Near the top of the upper section 11 the sides 19 and 21 are turned inwardly at an angle of approximately 45° as shown at 24 and 26 to join the horizontal portion of the top 18. The horizontal top of the tank is from ½ to ¾ the width of the tank at the point where the top portions of the side walls turn inwardly. This construction forms a truss or arch shaped top portion which provides greater resistance to the earth load on top of the tank when in used and reduces the unsupported space of the sides. Also, near the bottom of the lower section 10 the sides 13 and 14 are turned inwardly at an angle of approximately 45° as at 27 and 28 to join the horizontal portion of the bottom 12. The horizontal bottom of the tank is also from ½ to ¾ the width of the tank at the point where the bottom portion of the side walls turn inwardly. This construction forms an inverted truss or arched shaped bottom portion which reduces the unsupported span at both the sides and the bottom.

Figure 4:
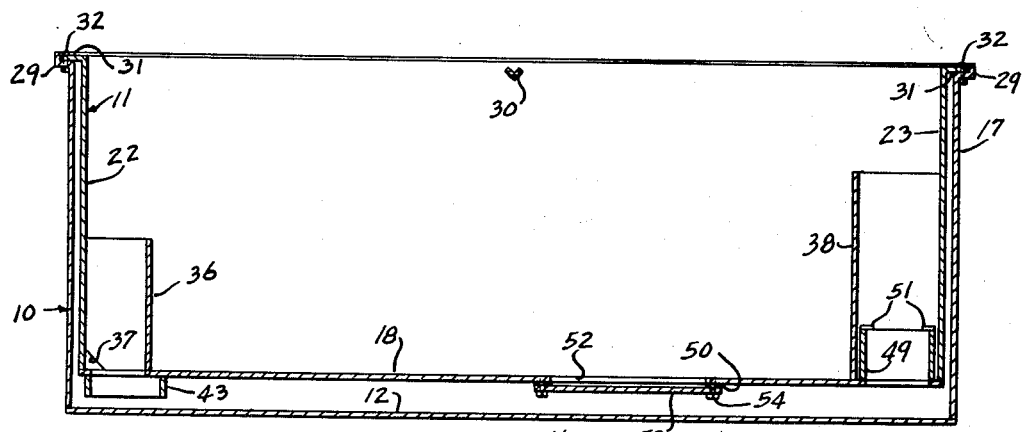
Figure 3:
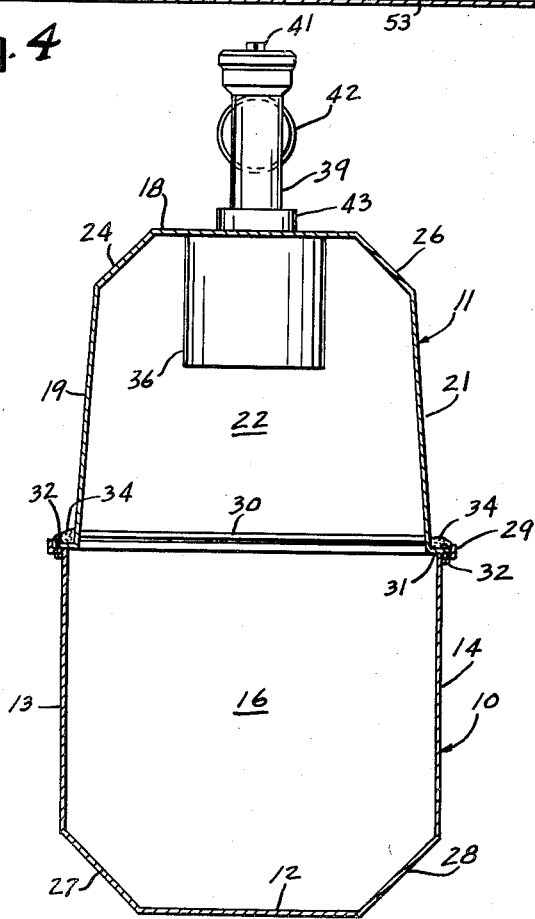
Fig. 3 is a transverse sectional view taken along the line III—III of Fig. 1; and, Fig. 4 is a longitudinal sectional view of a septic tank in the nested position.

The lower section 10 of the tank is provided with an outwardly and upwardly turned flange 29 along its upper edge extending all around the section. The upper section 11 is provided with an outwardly turned flange 31 extending all around the section along its lower edge, which is adapted to fit within the flange 29. The flanges are joined together by bolts 32 to retain the sections in either the operating position as shown in Fig. 1 or in the nested position as shown in Fig. 4. The flanges 29 and 31 give added strength to the tank thus providing a tank of the requisite strength with a minimum thickness of material. To give additional strength to the upper section 11 I provide a transverse tie 30 which extends between and is secured to the sides 19 and 21. The flanges 29 and 31 provide a sealing groove 33 which extends all around the tank and is filled with a suitable sealing material 34, such as asphalt or tar to provide a fluid tight joint.

The upper section 11 of the tank is provided, at one end with an inlet baffle 36 which is semicircular in horizontal cross section, as shown in Fig. 1. Vents or openings 37 are provided in the sides of the inlet baffle 36 adjacent the top thereof to permit gases to escape from the tank through the house plumbing stack, not shown. An outlet baffle 38 circular in cross section is provided at the opposite end of the upper section 11.

Communicating with the septic tank through the top 18, outwardly of and within the confines, of the inlet baffle 36 is a vertically extending inlet pipe fitting or T 39. At the top of the inlet fitting 39 is a clean-out plug 41 and extending at right angles to and communicating with the inlet conduit 39 is an inlet branch pipe 42. A collar 43 for packing the inlet fitting 39, surrounds and is spaced from the inlet fitting and is secured to the top 18 as by welding. Molten lead 44 or other suitable joint material is poured between the collar 43 and the inlet fitting 39 to form a joint between the members.

Communicating with the septic tank through the top 18 outwardly of, and within the confines, of the outlet baffle 38 is a vertically extending outlet pipe fitting or T 46. At the top of the outlet fitting is a clean-out plug 47 and extending at right angles to, and communicating with, the outlet fitting is an outlet branch pipe 48. The outlet fitting 46 extends through the top 18 so as to have a portion thereof projecting within the tank. Surrounding the portion of the outlet fitting 46 projecting within the tank is a packing collar 49. The collar 49 is secured to the inner surface of the top 18 and molten lead or other suitable joint material is poured between the collar and the outlet fitting 46 forming a lead joint between the members. To support the outlet fitting 46, small metal clips or a metal ring 51 are welded to the bottom of the collar 49.

The top 18 is also provided with a manhole 52 intermediate the ends thereof and having a cover 53 held in place by any suitable means such as clips or bolts 54. A fluid tight joint is formed between the cover 53 and the tank by means of a gasket 50.

To protect the tank from corrosion before it is installed and to protect the outside surface, after installation, the tank is coated with a bituminous coating compound. The coating should be of a substantial thickness and may be applied either by hot dipping or spraying.

In assembling the tank, the upper section 11 of the tank is placed on the lower section 10 so that the outwardly extending flange 31 of the upper section fits within the outwardly and upwardly extending flanges 29 of the lower section. The sections are then secured together by means of the bolts 32 and the sealing material 34 is placed in the groove 33. The tank is then installed in the usual manner.

Sewage introduced into the upper section 11 of the tank through the inlet branch pipe 42 flows downwardly through the vertically extending inlet conduit 39 into the tank. It is then directed downwardly by the inlet baffle 36. Liquid flows out under the outlet baffle 38 through the vertically extending outlet conduit 46 then out through the outlet branch 48 to the soil disposal area, as is well understood.

Since the inlet and outlet connections to the tank are through the top or cover 18 of the tank, the cover is submerged in the liquid contents of the tank. The water line should be at least one inch above the top of the tank, thus assuring that the inside of the tank cover 18 is always submerged below the water line.

The submerged cover 18 also causes the floating solids or scum that is formed in the tank to be submerged. The scum is thus kept below the water line where it remains wet and intimately mixed with the sewage. This causes the scum to digest along with the other sewage solids thus greatly reducing the volume of scum retained within the tank. The digestion of the floating scum greatly increases the efficiency of the tank and considerably increases its useful life without cleaning.

The inlet and outlet to the tank may be easily cleaned by means of the clean out plugs 41 and 47 at the top of the vertically extending conduits 39 and 46 respectively.

As is well known, one of the most common causes of trouble with the operation of septic tanks is stoppage in the inlet conduit caused by solids backing up in the pipe or fittings as a result of the head created by the floating scum in the tank. The submerged cover eliminates this condition and also provides a readily accessible clean-out immediately above the inlet connection.

The outlet conduit to the tank has also been a common source of trouble in the operation of septic tanks due to the rising of the tank effluent behind the outlet baffle. This difficulty has also been eliminated by submerging the top cover for the tank and providing the convenient clean-out opening 47.

By eliminating the air space above the liquid within the tank I have been able to reduce the depth and volume of the tank by about 20 percent without reducing the effective capacity of the area where digestion of the sewage solids takes place. A reduction in depth of the tank is of considerable importance particularly in areas where rock excavation is encountered in excavating for the tank or in places where high ground water or rugged topography is encountered.

From the foregoing it will be seen that I have provided an improved tank construction which is simple of design and economical of manufacture. By greatly reducing the depth and volume without reducing the effective capacity of the tank, I have also provided a tank which requires less material to manufacture, is easier to handle, and one which is adapted for installation near the surface of the ground. Also by reducing the volume of accumulated floating scum in the tank the frequency of cleaning out the tank is greatly reduced.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a metal septic tank having inlet and outlet baffles, a top for the tank, an inlet conduit connected to the top of the tank and communicating with the inside thereof outwardly of said inlet baffle, a vertically extending pipe fitting having its lower end connected to the top of the tank and communicating with the inside thereof outwardly of said outlet baffle, a clean-out plug at the upper end of said pipe fitting, and an outlet branch communicating with said pipe fitting intermediate said clean-out plug and the top of the tank to maintain a fluid level above the top of said tank.

2. In a metal septic tank having an integral top, an inlet baffle semi-circular in horizontal cross section with the sides thereof secured to one end of the tank and with its upper end substantially in contact with the top of the tank, an outlet baffle semi-circular in horizontal cross section with the sides thereof secured to the opposite end of the tank and with its upper end substantially in contact with the top of the tank, a vertically extending inlet conduit connected to the top of the tank and communicating with the inside thereof within the confines of said inlet baffle, a vertically extending outlet conduit connected to the top of the tank and communicating with the inside thereof within the confines of said outlet baffle, clean-out plugs at the top of said inlet and outlet conduits, an inlet branch communicating with the inlet conduit intermediate the top of the tank and the clean-out plug for the inlet conduit, and an outlet branch communicating with the outlet conduit above the top of the tank and below the clean-out plug for the outlet conduit whereby the tank is maintained completely filled with liquid.

3. In a metal septic tank having an integral top, an inlet baffle semi-circular in horizontal cross section secured to one end of said tank and close enough to the top of the tank to prevent floating material in the tank from flowing over the top of the baffle, an outlet baffle semi-circular in horizontal cross section secured to the opposite end of said tank and likewise close enough to the top of the tank to prevent floating material in the tank from flowing over the top of the outlet baffle, a vertically extending inlet conduit connected to the top of the tank and communicating with the inside thereof within the confines of said inlet baffle, a collar spaced from and surrounding said inlet conduit, a packed joint between said collar and the inlet conduit, a vertically extending outlet conduit having an outlet branch located above the top in a position to maintain the tank completely filled with liquid with the lower portion thereof projecting through the top of the tank and communicating with the inside thereof within the confines of the outlet baffle, a collar spaced from and surrounding said projecting portion and secured to the inner surface of the top of the tank, a packed joint between the collar and the outlet conduit, and means to support the outlet conduit.

4. A metal septic tank as defined in claim 3 in which the outlet conduit is supported by means of inwardly projecting metal clips secured to the lower edge of the collar which surrounds the outlet conduit.

5. A metal septic tank as defined in claim 3 in which each inlet and outlet conduit is in the form of a T having a clean-out plug at the top thereof and a branch intermediate said clean-out plug and the top of the tank.

References Cited in the file of this patent

UNITED STATES PATENTS

| Number | Name | Date |
| --- | --- | --- |
| 869,001 | Lucas | Oct. 22, 1907 |
| 880,540 | Kinealy | Mar. 3, 1908 |
| 917,663 | Rogers | Apr. 6, 1909 |
| 1,204,534 | Andrews | Nov. 14, 1916 |
| 1,224,913 | Ferguson | May 8, 1917 |
| 1,337,431 | Berry, Jr. | Apr. 20, 1920 |
| 1,401,182 | Overton | Dec. 27, 1921 |
| 1,769,340 | Gutman et al. | July 1, 1930 |
| 2,553,885 | Van Orman et al. | May 22, 1951 |

FOREIGN PATENTS

| Number | Country | Date |
| --- | --- | --- |
| 21,547 | Sweden | Sept. 30, 1905 |
| 274,999 | Germany | June 4, 1914 |
| 513,351 | Germany | Nov. 26, 1930 |
| 581,860 | Germany | Aug. 3, 1933 |